_United States Patent_ [19]

Smith

[11] 4,014,510
[45] Mar. 29, 1977

[54] PILOT VALVE
[75] Inventor: Carl K. Smith, Mathis, Tex.
[73] Assignee: Midcon Pipeline Equipment Co., Fort Worth, Tex.
[22] Filed: Sept. 5, 1975
[21] Appl. No.: 610,777
[52] U.S. Cl. .................... 251/63; 251/332; 251/361; 251/DIG. 1
[51] Int. Cl.$^2$ .................................. F16K 1/46
[58] Field of Search ............ 251/62, 324, 332, 361, 251/DIG. 1, 63

[56]         References Cited
         UNITED STATES PATENTS

| | | | |
|---|---|---|---|
| 2,910,267 | 10/1959 | Holby | 251/332 |
| 2,928,646 | 3/1960 | Ashbrook | 251/361 X |
| 2,971,090 | 2/1961 | Piet et al. | 251/DIG. 1 |
| 3,272,218 | 9/1966 | Johnson | 251/332 X |
| 3,307,574 | 3/1967 | Anderson | 251/62 X |
| 3,542,332 | 11/1970 | Chevalier | 251/62 X |
| 3,563,508 | 2/1971 | Delorenzo | 251/324 X |

_Primary Examiner_—Arnold Rosenthal
_Attorney, Agent, or Firm_—Carl B. Fox, Jr.

[57]         ABSTRACT

Pilot valve, of the quick opening and quick closing type, actuated to open or close by a hydraulic fluid acting on a piston.

7 Claims, 2 Drawing Figures

PILOT VALVE

BACKGROUND OF THE INVENTION

In, for example, certain water feed and water washing operations it is necessary to utilize a quick opening and quick closing valve to control the water supply so that acurate control of the water input may be obtained, and so that water flow will not occur at reduced rates as the valve is opened and closed. For example, in concrete mixing operations, a certain amount of water must be introduced to the concrete mixture, and adequate control of the water cannot be obtained unless the valve is of the quick acting type. The instant valve was developed primarily for this purpose, but may be used in other processes requiring a quick opening and quick closing valve.

SUMMARY OF THE INVENTION

The invention provides a pilot valve which is quick opening and quick closing. A piston acted upon by hydraulic fluid, liquid or gas, controls valve actuation, and the valve response is very fast and definite. The piston is carried on the valve stem in a separate hydraulic cylinder space within the valve body, and the valve structure is very compact and dependable. Adequate seals are provided whereby intermixing of the hydraulic fluid with the fluid controlled by the valve does not occur.

A principal object of the invention is to provide a quick acting pilot valve. Another object of the invention is to provide such a valve which opens and closes quickly and dependably. Further objects of the invention are to provide such a valve which is simple in construction, and yet which is entirely reliable and safe, and which is economical to manufacture.

Other objects and advantages of the invention will appear from the following detailed description of a preferred embodiment, reference being made to the accompanying drawings.

DESCRIPTION OF THE PREFERRED EMBODIMENT

Figure 1:
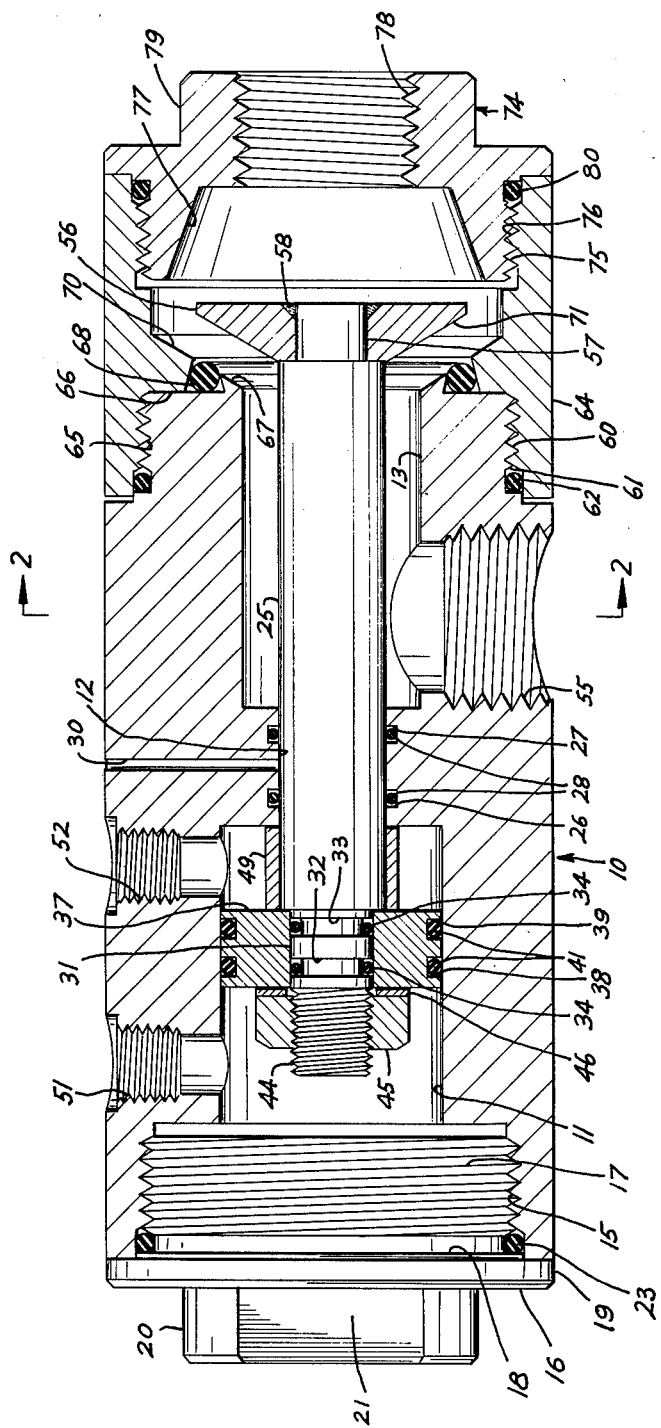
FIG. 1 is an axial cross section of a preferred embodiment of pilot valve according to the invention.
Figure 2:
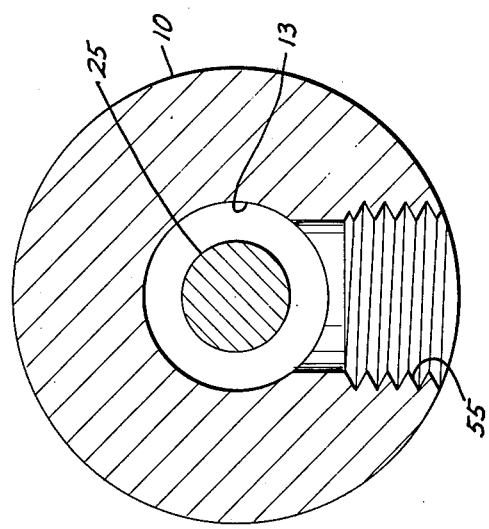
FIG. 2 is a transverse cross section taken at line 2—2 of FIG. 1.

Referring now to the drawings in detail, the valve body 10 is of outward cylindrical shape, and has a stepped axial passage therethrough. The passage includes a cylindrical piston chamber 11, a cylindrical shaft or stem passage 12 and a cylindrical valve chamber 13. An enlarged threaded socket 15 receives a cap 16 which closes and seals the left-hand end of the cylinder 11. Cap 16 includes a threaded portion 17 which screws into threaded socket 15, an annular O-ring seal groove 18 of rectangular cross section, a cap plate 19, and a cylindrical formation 20 having opposite flats 21 for use in rotating the cap to screw it into valve body or to remove it from the valve body. A circular O-ring 23 is disposed in groove 18 to form a fluid tight seal around the cap in socket 15.

The valve shaft or stem 25 extends closely through cylindrical passage 12, there being two annular O-ring seal grooves 26, 27 around passage 12 each having an O-ring 28 therein providing seals around stem 25. Stem 25 and O-rings 28 provide a barrier seal between piston chamber 11 and valve chamber 13. A bleed port 30 extends from passage 12 to the exterior of the valve body to drain any hydraulic fluid which may leak from cylinder 11 past the O-ring 28 in groove 26, or any fluid which may leak from chamber 13 past O-ring 28 in groove 27, this arrangement effectively eliminating any possibility of intermixing of the hydraulic fluid in cylinder 11 with the fluid flowing through valve chamber 13.

At the lefthand end of stem 25, as shown in FIG. 1, stem 25 is reduced at 31 and has therearound two axially spaced O-ring seal grooves 32, 33, each containing an O-ring 34. Ring shaped piston 37 is closely fitted around portion 31 of the stem. Piston 37 has a pair of axially spaced O-ring seal grooves 38, 39 each containing an O-ring 41. O-ring 34 seal between stem 25 and piston 37, and O-rings 41 seal between piston 37 and the wall of cylinder 11. Beyond stem portion 31, the stem is threaded at 44, and a nut 45 screwed onto the stem threads secures the piston 37 to the stem. A washer 46 is disposed about stem 25 between nut 45 and piston 37. A sleeve 49 fits closely around stem 25 at the right hand side of piston 37, and is of a length to limit rightward movement of stem 25 and piston 37.

A pair of threaded flow ports 51, 52 are disposed radially from the exterior of valve body 10 to cylinder 11, these ports permitting flow of a hydraulic fluid to opposite sides of piston 37. Suitable hydraulic lines (not shown) are screwed into ports 51, 52.

At the lefthand end of valve chamber 13, a threaded outlet flow port 55 is provided. A conically tapered valve disc 56 is closely fitted around reduced stem portion 57 and fixed to the stem by weld 58. Valve body 10 is annularly relieved and threaded at 60 and has an O-ring seal groove 61 annularly therearound at the inner end of the threads. A circular O-ring seal 62 is disposed in groove 61. A ring-shaped retainer 64 has threaded socket 65 screwed onto threads 60 of the valve body and is formed inwardly at 66 to cooperate with annular rib formation 67 of the valve body to retain an O-ring 68. The end of annular rib 67 and surface 70 of the retainer 64 are conical to form a seat against which conical side 71 of valve 56 seats. O-ring 68 provides a positive seal around valve 56 when it is in seated position.

A fluid inlet fitting 74 has relieved end 75 which is threaded and which is screwed into threaded socket formation 76 at the outer end of retainer 64. A circular O-ring seal 80 is provided around the outer end of threaded socket formation 76 as shown to seal between fitting 74 and retainer 64. Fitting 74 is conically flared toward valve 56 at 77 and has threaded passage 78 to provide a connection to a suitable flow line. The end portion 79 of fitting 74 is reduced as shown, and may have suitable flats (not shown) at its outer surface for use in tightening the threaded connections.

A suitable outlet flowline may be connected to threaded socket 55, extending therefrom to a point where the fluid flowing through the valve is to be utilized. A fluid inlet conduit is connected to threaded passage 78, extending from a suitable source of the fluid.

To operate the valve, suitable hydraulic lines are connected to threaded sockets 51, 52. When higher pressured hydraulic fluid is supplied through port 52 than through port 51, piston 37 is moved toward the left, moving valve 56 to a position seated against the conical valve seat and O-ring 68. To open the valve, hydraulic fluid of higher pressure is introduced through port 51 than through port 52, this causing moving of piston 37 toward the right to lift valve 56 off of its seat. As may easily be understood, the valve is very quick acting, because of the relatively large surface areas of piston 37. The valve action is quick and positive, so that the valve is either fully opened or fully closed rapidly. When the valve is closed by imposition of higher pressured hydraulic fluid through port 52, the valve closes rapidly and forms a perfectly fluid tight seal at O-ring 68, so that there is no lingering flow through the valve once the valve is closed. When a higher pressured hydraulic fluid is introduced through port 51, the valve opens rapidly and full flow is obtained therethrough immediately.

Ordinarily fluid flows in through passage 78 and out through passage 55. The inlet fluid pressure presses valve 56 against the seat, so that a tight seal around the valve is maintained. Even if the fluid lines are disconnected from passages 51, 52, or if flow conduits thereto are externally interconnected, the inlet fluid pressure to the right of valve disc 56 will maintain the valve disc in tightly closed condition, or will close the valve. The valve is thus self-closing, and is self-maintaining in the closed position if the flow through the valve is in the normal direction.

The valve structure shown and described provides quick commencement of flow and quick shut off of flow when operated as described. Therefore, the valve is useful for time-metered flow situations where an accurate flow volume of liquid or gas controlled by the valve is required.

While a preferred embodiment of the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Pilot valve, comprising a valve body having a cylindrical piston chamber opening thereinto from one of its ends and having a cylindrical passage opening thereinto from the other of its ends, said chamber and passage being coaxially aligned, a cylindrical shaft passage extending coaxially between said chamber and said passage through said valve body, a ring member having one of its ends concentrically disposed around said other end of said valve body and sealingly connected thereto, said ring member having an inwardly projecting annular formation therearound one side of which is engaged with said other end of said valve body and the other side of which forms a valve seat, said other end of said vaove body having an annular inward portion aligned with said valve seat and forming a continuation thereof, a cylindrical valve shaft sealingly but slidably disposed through said shaft passage and extending into said chamber at one end and into said passage at the other end and fixed to a piston sealingly but slidably disposed in said chamber at its said one end and to a valve at its said other end, said valve being sealingly seatable against said valve seat and being moved to seat thereagainst by movement of said shaft in one axial direction and being moved away from said valve seat by movement of said shaft in the other axial direction, a first removable closure closing the open end of said chamber, a second removable closure having a fluid flow inlet therethrough closing the other end of said ring member, a first fluid port to said chamber through said valve body at one side of said piston and a second fluid port to said chamber through said valve body at the other side of said piston, and a fluid outlet through said valve body extending from said passage to the exterior of said valve body.

2. The combination of claim 1, said valve seat having an annular groove therearound formed between said ring member and said valve seat continuation having a sealing element disposed therein to assist in sealing between said valve seat and said valve when said valve is seated against said valve seat.

3. The combination of claim 2, said sealing element comprising an O-ring.

4. The combination of claim 2, said valve seat and said valve each having correspondingly conically tapered engagement surfaces.

5. The combination of claim 4, and sealing element comprising an O-ring.

6. The combination of claim 1, including spaced sealing rings around said valve shaft at said shaft passage and a bleeder port through said valve body therebetween whereby any fluid leakage into said shaft passage from said chamber and said passage is drained through said bleeder port and mutual contamination of the fluids in said chamber and said passage is prevented.

7. The combination of claim 6, said sealing rings comprising O-rings disposed in annular grooves around said shaft passage.

* * * * *